United States Patent

[11] 3,573,763

[72] Inventor Bohumir Sramek
Phoeniz, Ariz.

[21] Appl. No. 798,320
[22] Filed Feb. 11, 1969
[45] Patented Apr. 6, 1971
[73] Assignee General Electric Company

[54] WORD DRIVER FOR A MAGNETIC MEMORY
4 Claims, 4 Drawing Figs.

[52] U.S. Cl. 340/174
[51] Int. Cl. G11c 7/00, G11c 5/02
[50] Field of Search 340/174; 307/88

[56] References Cited

UNITED STATES PATENTS

| | | | |
|---|---|---|---|
| 3,054,988 | 9/1962 | Edwards et al. | 340/174X |
| 3,329,829 | 7/1967 | Grimm et al. | 307/88 |
| 3,457,555 | 7/1969 | Tsui | 340/174 |

*Primary Examiner*—Stanley M. Urynowicz, Jr.
*Attorneys*—George V. Eltgroth, Edward W. Hughes, James A. Pershon, Frank L. Neuhauser, Oscar B. Waddell, Joseph B. Forman and Lloyd B. Guernsey

ABSTRACT: A word driver for writing and reading information in a magnetic memory having transistors connected directly to TTL logic circuits without the need for buffer amplifiers and decoding circuitry between the transistors and logic circuits.

TTL LOGIC CIRCUIT

INVENTOR
BOHUMIR SRAMEK

BY Lloyd B. Guernsey

AGENT

WORD DRIVER FOR A MAGNETIC MEMORY

BACKGROUND OF THE INVENTION

This invention relates to magnetic memory devices and more particularly to a word driver for use with a magnetic memory. The word driver provides a drive current which causes information to be stored in a magnetic memory or causes information to be read from the magnetic memory.

Data processing systems employ memories which are used to store information for use in data processing. These memories may comprise a plurality of magnetic cores or they may comprise a thin film of the magnetic material deposited on a sheet of nonmagnetic material. When these magnetic materials are deposited in the presence of a magnetic field, the thin magnetic film exhibits a property of uniaxial anistrophy. Here uniaxial anistrophy is understood to mean that tendency of groups of molecules called "magnetic domains" throughout the film to align themselves along a preferred axis of magnetization. This preferred axis is often referred to as an "easy axis," while the direction of magnetization perpendicular to this axis in the plane of the film is often referred to as the transverse or "hard axis" of the film. The uniaxial thin magnetic film exhibits a single easy axis of magnetization defining opposite stable states of remnant flux orientation. In one of these stable states the magnetic domains of the film may be aligned in one direction along the easy axis to represent a binary 1. In the other of the stable states, the magnetic domains may be aligned in the opposite direction along the easy axis to represent a binary 0.

A matrix of electrical conductors including sense lines and write lines may be positioned adjacent to the thin film and electrical currents in the write lines may be used to rotate the magnetic domains in small selected areas or "memory sites" of the thin film and to store or "write" digital information in these sites. Electrical currents in the sense lines may be used to detect the direction of magnetization of the film in predetermined memory sites and to "read" the digital information stored in these sites.

The electrical currents in the write lines are provided by a plurality of word drivers. In prior art data processing systems a plurality of TTL logic circuits supply signals which are decoded by a decoder matrix and amplified by a set of buffer amplifiers. The buffer amplifiers then supply signals to the word drivers. Prior art word drivers employ a plurality of PNP transistors and a plurality of NPN transistors. TTL logic circuits do not provide signals of the polarity which can be used to drive both NPN and PNP transistors in prior art word drivers. The buffer amplifiers are needed in order to amplify the signals and to provide the required polarities of signals to the combination of the NPN and PNP transistors. It is desirable, therefore, to provide an improved circuit which employs only one type of transistor so that the word drivers can be connected directly to the TTL logic circuits and the buffer amplifiers can be eliminated.

The speed of operation of the magnetic memory is determined by the speed of operation of the word selection matrix, the buffer amplifiers and the word driver. The matrix, the amplifiers and the driver each cause a predetermined amount of time delay in a signal from the logic circuits which supply the signals. If the buffer amplifiers and the decoding matrix can be eliminated and if the delay in the word driver can be reduced, the speed of operation of the memory can be increased and the amount of power dissipated can be reduced. It is desirable to develop a single circuit which would act as a decoding matrix and as a word driver for the magnetic memory. It is also desirable that the word drivers be constructed as a microelectronic circuit by forming the entire circuit on a single "chip" or block composed of semiconductor material to reduce the physical size of the drivers.

It is, therefore, an object of this invention to provide a new and improved word selection matrix and word driver for a magnetic memory.

Another object of this invention is to provide a new and improved high speed word selection matrix and word driver for use with a magnetic memory.

A further object of this invention is to provide a high speed word selection matrix and word driver having low power dissipation.

A further object of this invention is to provide a high speed selection matrix and word driver which can be readily constructed as a microelectronic circuit.

Still another object of this invention is to provide a high speed word selection matrix and word driver which is adapted to be driven directly by TTL logic circuits.

Another object of this invention is to provide a high speed word selection matrix and word driver using only NPN type transistors which are compatible with microelectronic circuit technology.

SUMMARY OF THE INVENTION

The foregoing objects are achieved in a selection matrix and word driver employing a plurality of NPN transistors formed on a block of semiconductor material. The NPN transistors can be connected directly to TTL logic circuits without any buffer amplifiers and without any decoding matrix between the NPN transistors and the logic circuits.

DESCRIPTION OF THE PREFERRED EMBODIMENT

The present invention relates to a word selection matrix and word driver for use with a plurality of TTL logic circuits and a magnetic memory having a plurality of word transmission lines. Since TTL logic circuits are well known in the art it is believed to be unnecessary to describe the well known details of these logic circuits in order to completely describe the invention. However, even though known details will be illustrated, the basic description of the TTL logic circuit will be presented to enable one skilled in the art to understand the environment in which the present invention is placed.

Figure 1:
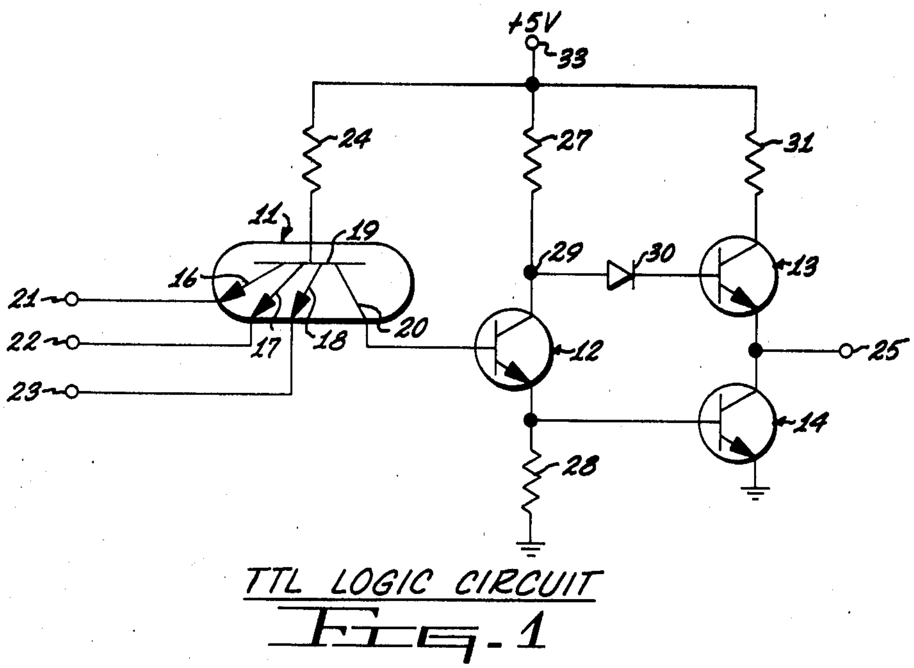
FIG. 1 is a circuit diagram of a typical TTL logic circuit which can supply logic signals for the circuit of the instant invention.

Referring more particularly to the drawings by characters or reference, FIG. 1 discloses a typical TTL logic circuit having a plurality of transistors 11, 12, 13 and 14. The circuit shown in FIG. 1 is called a "transistor-transistor NAND-gate" and is a circuit which is indigenous to integrated circuit systems. Integrated circuits are particularly easy to fabricate as single transistors each having a single base and a single collector, but with several emitters, such as the transistor 11 shown in FIG. 1. Transistor 11 is shown with a plurality of emitters 16, 17, and 18, a base 19, and a collector 20, but it should be understood that additional emitters may be added. The transistors 12, 13 and 14 each have a base, a collector, and a single emitter. The emitters of transistor 11 are connected to a plurality of signal-input terminals 21, 22 and 23. The base 19 of transistor 11 is connected to a source of voltage such as a +5 volts by a resistor 23 and the collector of transistor 11 is connected to the base of transistor 12. When a low value of voltage such as 0 volts is applied to any one of the signal-input terminals 21, 22 and 23, the collector of the transistor 11 will be effectively at 0 volts DC. A low value of voltage at the collector of transistor 11 and at the base of transistor 12 causes transistor 12 to be rendered nonconductive. When transistor 12 is rendered nonconductive, a low value of voltage will be present at the emitter of transistor 12 and a positive value of voltage at the collector of transistor 12. The low value of voltage at the emitter of transistor 12 and at the base of transistor 14 causes transistor 14 to be nonconductive. The positive value of voltage at the collector of transistor 12 provides a positive value of voltage at the base of transistor 13, which causes transistor 13 to be rendered conductive and produces a positive value of voltage at the signal-output terminal 25. When transistor 13 is rendered conductive a low value of impedance is present between the output terminal 25 and the +5 volts so that a large current can flow to a load which may be connected to signal-output terminal 25.

When a positive value of voltage such as a +3 volts is applied to each of the signal-input terminals, 21—23, a positive value of voltage will be present at the collector of transistor 11 and at the base of transistor 12. The positive voltage at the base of transistor 12 renders transistor 12 conductive so that a positive voltage appears at the emitter of transistor 12. The positive voltage at the emitter of transistor 12 renders transistor 14 conductive so that a low impedance is present between the signal-output terminal 25 and ground. When transistor 12 is rendered conductive, the voltage at the collector of transistor 12 decreases so that the voltage at the base of transistor 13 decreases, thereby rendering transistor 13 nonconductive. The low impedance between the output terminal 25 and ground, through transistor 14, means that any load which may be connected to output terminal 25 will be affectively shorted to ground so that the voltage at terminal 25 will quickly decrease to substantially ground potential.

Figure 2:
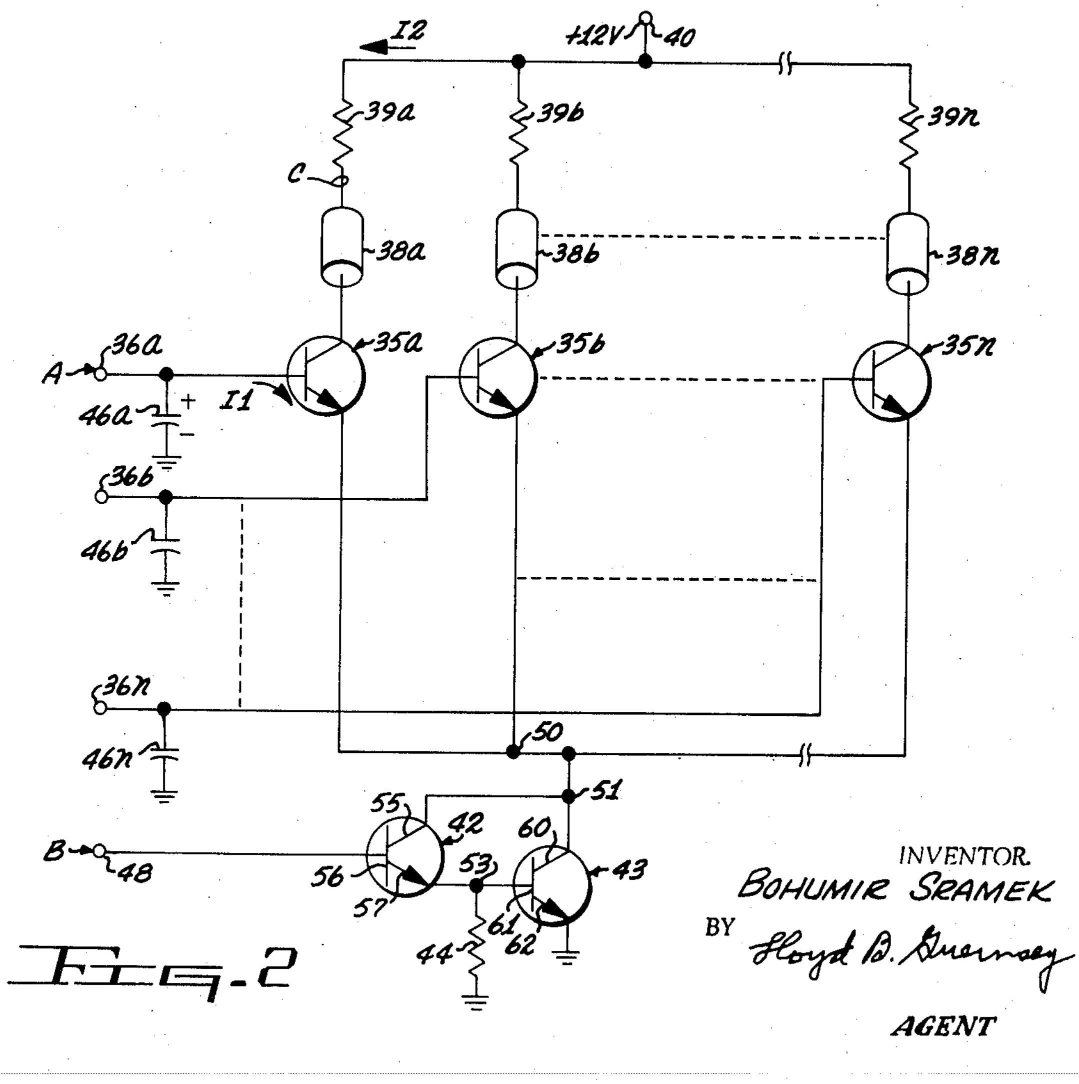
FIG. 2 is a circuit diagram of one embodiment of the instant invention.

The word selection matrix and word driver for use with the magnetic memory shown in FIG. 2 is especially adapted to be used with the TTL logic circuit shown in FIG. 1. The word selection matrix and word driver includes a plurality of transistors **35*a*—35*n*, each having a base, a collector, and an emitter. Each of the bases of the transistors 35*a*—35*n* is connected to a corresponding one of the signal-input terminals 36*a*—36*by*. The collectors of each of the transistors 35*a*—35*n* is connected to a corresponding one of the plurality of word transmission lines 38*a*—38*n*. Each of the resistors 39*a*—39*n* is connected between a corresponding one of the transmission lines 38*a*—38*n* and a terminal 40 which is connected to a first reference potential, such as +12 volts. The emitters of each of the transistors 35*a*—35*n* are connected to the collectors of a pair of transistors 42 and 43. The emitter of transistor 42 is connected to the base of transistor 43, the base of emitter of transistor 43 is connected to a second reference potential, such as ground. The base of transistor 43 is connected to a signal-input terminal 48 and the emitter of transistor 42 is connected through a resistor 44** to ground.

The operation of the word selection matrix and word driver shown in FIG. 2 will now be described in connection with voltage signals which are represented by the waveforms shown in FIG. 3. The voltage shown in waveform A of FIG. 3 may be applied to any of the signal-input terminals **36*a*—36*n* and the voltage shown in waveform B may be applied to signal-input terminal 48. For example, the signal represented by waveform A may be applied to signal-input terminal 36*a***. Prior to time *t*1 (FIG. 3) the voltage applied to input terminal **36*a* causes transistor 35*a* to be rendered nonconductive and the waveform represented by waveform A applied to the input terminal 48** causes transistors 42 and 43 to be rendered nonconductive.

Figure 3:
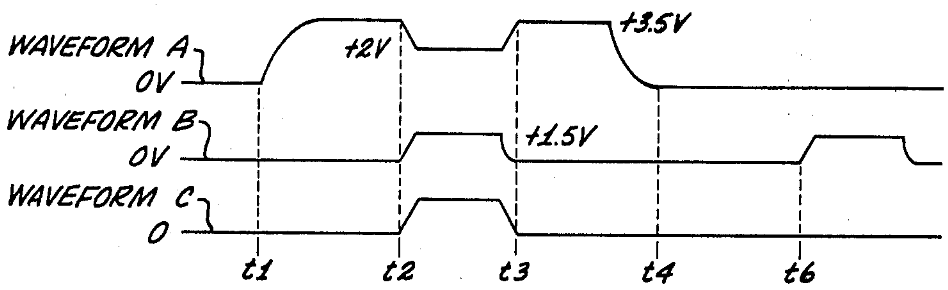
FIG. 3 illustrates waveforms which are useful in explaining the operation of the invention in FIG. 1.

At time *t*1 in FIG. 3, the voltage applied to the signal-input terminal **36*a* (FIG. 2) is positive so that transistor 35*a* will be rendered conductive when a low value of voltage is applied to the emitter of transistor 35*a***. However, at time *t*1 transistors 43 and 42 are nonconductive so that current can not flow from the emitter of transistor **36*a* to ground, thereby causing transistor 36*a* to be nonconductive. The input voltage at terminal 36*a*, however, does charge the capacitor 46*a* to the polarity shown in FIG. 2**.

At time *t*2 (FIG. 3) the positive voltage applied to signal-input terminal 48 renders transistor 42 conductive which causes transistor 43 to be rendered conductive. A current I1 flows from the upper plate of capacitor **46*a*, through base to emitter of transistor 35*a*, through collector to emitter of transistor 43 to ground. Current I1 renders transistor 35*a* conductive so that a current I2 flows from terminal 40, through resistor 39*a*, transmission line 38*a*, from collector to emitter of transistor 35*a*, through collector to emitter of transistor 43 to ground. Current I2 through line 38*a*** causes digital information to be written into memory sites in a magnetic memory (not shown).

The relatively large value of positive voltage at the base of transistor **35*a* causes transistor 35*a*** to operate in a saturated condition between time *t*2 and time *t*3. The value of voltage at the base of transistor **35*a* is substantially constant during this time so that the transistor 35*a*** operates as a "grounded-base" transistor. A grounded-base transistor has a relatively fast turn-on time and a relatively fast turnoff time even when operated in a saturated condition.

Figure 4:
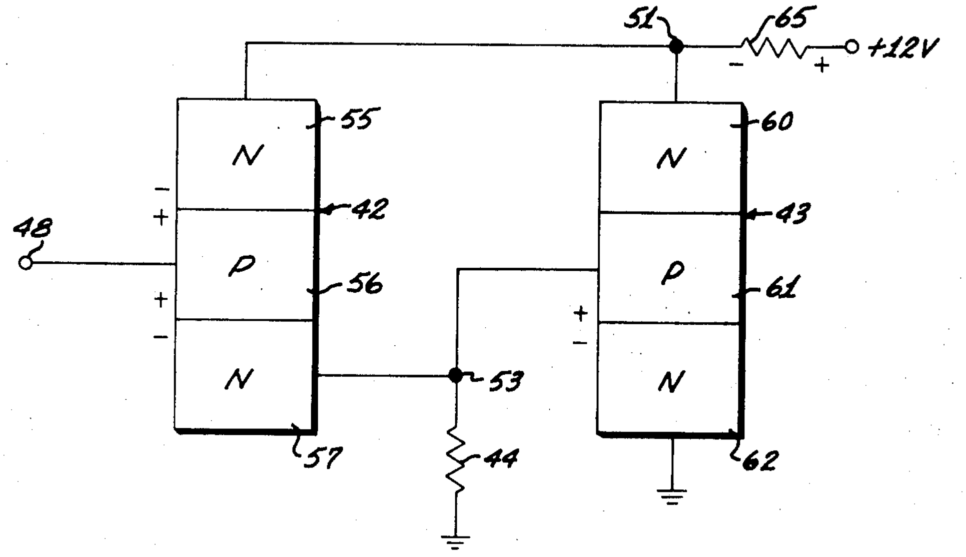
FIG. 4 illustrates the operation of a portion of the circuit shown in FIG. 2.

A grounded emitter transistor, such as transistor 43 has a relatively slow turnoff time when operated in a saturated condition. Saturation is prevented and turnoff time is decreased by connecting transistor 42 between the collector and base of transistor 43 as shown in FIG. 2 and FIG. 4. FIG. 4 illustrates the construction of the NPN transistors 42 and 43 and aids in showing how saturation of transistor 43 is prevented by transistor 42.

Saturation may be defined as a condition in which the junction between the base and the emitter (base-emitter junction) is forward-biased at the same time the junction between the base and the collector (base-collector junction) is forward-biased. A junction is forward-biased when a positive voltage is applied to the P-type semiconductor material and a negative voltage is applied to the adjoining N-type semiconductor material. For example, in FIG. 4 when a positive voltage is applied to base 56 of transistor 42 and a negative voltage is applied to emitter 57 the base-emitter junction is forward-biased. A transistor operates in a conductive condition when the base-emitter junction is forward-biased and the base-collector junction is reverse-biased. A junction is reverse-biased when a negative voltage is applied to the P-type semiconductor material and a positive voltage is applied to the adjoining N-type semiconductor material. If both the base-emitter junction and the base-collector junction are reverse-biased the transistor is nonconductive.

The operation of the nonsaturating transistor amplifier comprising transistors 42 and 43 in FIG. 4 will now be described. If we assume that a suitable potential such as +12 volts is coupled to junction point 51 through an impedance represented by resistor 65, a positive potential is applied to junction point 51. A positive voltage applied to signal-input terminal 48 causes the base 56 to be more positive than emitter 57. In a typical silicon transistor there is a voltage drop of approximately 0.75 volts of the polarity shown between base 56 and emitter 57 to render transistor 42 conductive. A voltage drop of approximately 0.75 volts of the polarity shown between base 61 and emitter 62 of transistor 43 renders transistor 43 conductive. This causes a total voltage drop of +1.5 volts between base 56 of transistor 42 and emitter 62 of transistor 43.

If current through resistor 65 increases, a voltage drop of the polarity shown across resistor 65 causes the voltage at junction point 51 to decrease. When the voltage at junction point 51 decreases below the value of voltage at the base 56 of transistor 42, current flows from terminal 48 through base 56 to collector 55 causing a voltage drop of the polarity shown between base and collector. When transistor 42 saturates, the voltage drop between base 56 and collector 55 is approximately 0.6 volts. The +1.5 volts at base 56 and the 0.75 volts between base and collector causes the minimum voltage at junction point 51 to be +0.75 volts Since the voltage at base 61 of transistor 43 is also +0.75 volts, the base-collector junction of transistor 43 can not be forward-biased and transistor 43 can not saturate. Since transistor 43 does not operate in a saturated condition, transistor 43 can be turned off very rapidly at time *t*3, when the voltage at the input terminal 48 again decreases to a 0 voltage value. When transistor 43 is rendered nonconductive this causes transistor 35*a* to be rendered nonconductive so that current no longer flows through the transmission line 38*a*.

At time *t*4 the voltage at the base of transistor 35*a* renders transistor 35*a* so that it will not conduct. Thus, at a later time such as time *t*6 the voltage at the input terminal 46 can be positive and one of the other transistors 35*b*—35*n* could be rendered conductive to cause current to flow in another one of the transmission lines 38*b*—38*n*.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A word selection matrix and word driver for use with a plurality of TTL logic circuits and a magnetic memory having a plurality of word transmission lines, said driver comprising: a plurality of transistors each having a base, a collector and an emitter, said transistors being divided into first and second groups; an emitter resistor; first and second reference potentials; and a plurality of matching resistors, said collector of each of said transistors in said first group being connected to a first end of a corresponding one of said transmission lines, each of said matching resistors being connected between a second end of a corresponding one of said transmission lines and said first potential, said collector of a first transistor in said second group being connected to said emitters of said transistors in said first group, said emitter of said first transistor in said second group being connected to said second potential, said collector of a second transistor in said second group being connected to said collector of said first transistor in said second group, said emitter of said second transistor in said second group being connected to said base of said first transistor in said second group, said base of said second transistor in said second group being connected to one of said TTL logic circuits, said base of each of transistors in said first group being connected to a corresponding one of said TTL logic circuits, said emitter resistor being connected between said second potential and said emitter of said second transistor in said second group.

2. A word selection matrix and word driver as defined in claim 1 wherein the value of each of said resistors is substantially equal to the value of the impedance of each of said transmission lines.

3. A word selection matrix and word driver as defined in claim 1 including a plurality of capacitors, each of said capacitors being connected between said second potential and said base of a corresponding one of said transistors in said first group.

4. A word selection matrix and word driver as defined in claim 1 wherein the transistors are all of the same type.